United States Patent [19]

Yerushalmy et al.

[11] Patent Number: 4,517,437
[45] Date of Patent: May 14, 1985

[54] GAS SHIELDED PLASMA ARC TORCH AND COLLET ASSEMBLY

[75] Inventors: Yosef Yerushalmy; Larry W. Stokes, both of Florence, S.C.

[73] Assignee: Union Carbide Corporation, Danbury, Conn.

[21] Appl. No.: 460,552

[22] Filed: Jan. 24, 1983

Related U.S. Application Data

[63] Continuation of Ser. No. 219,876, Dec. 24, 1980, abandoned.

[51] Int. Cl.³ .................................................. B23K 9/00
[52] U.S. Cl. ................................ 219/121 PP; 219/75; 219/121 PM
[58] Field of Search ..... 219/121 P, 121 PX, 121 PM, 219/121 PR, 74, 75, 76.16, 121 PN, 121 PP

[56] References Cited

U.S. PATENT DOCUMENTS

| 3,069,532 | 12/1962 | Hill et al. | 219/75 |
| 3,250,889 | 5/1966 | Himmelman | 219/75 |
| 3,557,337 | 1/1971 | Sipos | 219/75 |
| 4,250,373 | 2/1981 | Tanida | 219/75 |

Primary Examiner—M. H. Paschall
Attorney, Agent, or Firm—Eugene Lieberstein

[57] ABSTRACT

A gas shielded plasma arc torch and collet assembly having a collet for receiving and gripping an electrode wherein the collet has spherical front and rear surfaces for engagement of and rotation in seats within the torch and a means for locking the position of the collet thereby locking and fixing the position of the electrode with respect to the torch.

9 Claims, 6 Drawing Figures

GAS SHIELDED PLASMA ARC TORCH AND COLLET ASSEMBLY

This application is a continuation of our prior U.S. application Ser. No. 219,876, filing date Dec. 24, 1980, now abandoned.

This invention relates to a device for locking an arc torch electrode in a fixed position in a gas shielded plasma arc torch. More particularly, this invention relates to a device which will lock an arc torch electrode in a selected position in a gas shielded plasma arc torch without creating forces tending to move the arc torch electrode off the selected locked position. The invention is most particularly useful for gas shielded plasma arc torch electrode centering.

BACKGROUND OF THE INVENTION

In plasma arc cutting or welding of metals, a non consumable electrode is recessed within an arc torch nozzle having a constricting outlet orifice. A gas, sometimes referred to as the orifice gas, is passed through the torch bore surrounding the electrode and exits through the constricting orifice. An electric arc is established between the tip of the electrode and the metal workpiece through the constricting orifice. The orifice gas is ionized by the arc to form a plasma and thus issues from the constricting nozzle orifice as a plasma jet. The ionized gas also provides a low electrical resistance path between the electrode and the workpiece. Stated otherwise, a closed electric circuit is maintained by the plasma arc directly between the tip of the electrode and the metal workpiece.

As is well known in the art, it is essential that the tip of the electrode be centered accurately with respect to the constricting outlet orifice. This permits the exiting orifice gas to surround, in a uniform manner, the tip of the electrode and the established electric arc as the gas approaches and issues from the constricting outlet orifice.

If the tip of the electrode is not accurately centered with respect to the constricting outlet orifice, what is referred to in the art as double arcing will occur. This is the jumping of the main current arc from the electrode to the nozzle and then from the nozzle to the workpiece. Double arcing usually destroys the nozzle. Double arcing usually occurs at the start of cutting or welding but may occur during cutting or welding if a properly centered electrode slips from its centered position.

Even if double arcing does not occur, an off center electrode still disrupts the plasma discharged from the constricting outlet orifice and impairs the quality of the cut or weld.

Therefore, those skilled in the art have attempted many approaches to insure that the tip of the electrode is accurately centered with respect to the constricting outlet orifice of a plasma arc torch nozzle. One approach has been to design the various parts of the torch with very close tolerances so that an assembled torch holding an electrode will achieve the required degree of electrode centering. Manufacture of such torch parts to the tolerances required is difficult and expensive. Moreover, even if a torch were manufactured to the required tolerance, the electrode itself may have eccentricities which will cause the tip of the electrode to be off center with respect to the constricting outlet orifice. That is, even though the electrode may be said to be a rigid rod, a given electrode will most likely have eccentricities about a nominal straight center axis.

Because of poor electrode centering, operators have frequently had to resort to rotation of the electrode and the electrode holder and, in some cases, even to bending of the electrode. However, these time consuming procedures have not resulted in sufficiently accurate centering, in many instances, to eliminate double arcing and to produce the desired high quality cuts or welds.

A second approach to the problem is to provide the torch with an adjustable electrode holding device for centering the electrode by the manual adjusting of the holding device. A torch which employs this approach is described and claimed in U.S. Pat. No. 3,069,532 to Hill et al. In U.S. Pat. No. 3,069,532, a collet for gripping and locking an electrode in a selected position is pivoted in the seat of what is referred to as an electrode holder. The point of pivoting is described in U.S. Pat. No. 3,069,532 as being in the lower portion of the torch bore (i.e., near the torch nozzle). The seat has the shape of a cone and the surface of the collet which pivots in the seat has the shape of a cone. That is, the geometric description of the pivot point would be a cone within a cone. The collet is released or locked in its position in the electrode holder seat by frictional force provided by a knob screwed into the upper end of the electrode holder (i.e., at the end of the torch opposite the torch nozzle). When the collet is released by retracting the knob, the collet and hence the electrode may be pivoted about the collet seat located near the bottom of the torch body bore. Thus a skilled operator can adjust the position of the electrode with respect to the center of constricting outlet orifice. After the tip is centered, the operator would then tighten the knob to lock the collet and the gripped electrode in place. Unless long collets were used, it was found that the tightening operation had a tendency to cause the collet to slip from the adjusted position which, in turn, would cause the tip of the electrode to move away from its centered position. The shorter the collet, the greater was the tendency to slip. This is believed attributable to the inability of the collet assembly to adequately lock the electrode in all adjusted positions. Hence, torch design was constrained by the desirability to use long collets.

OBJECT OF THE INVENTION

It is therefore an object of the present invention to provide a gas shielded plasma arc torch having a construction in which the electrode is held in a stable configuration for all adjusted positions.

It is a further object of the present invention to provide a gas shielded plasma arc torch having a construction which will permit the gripping and locking an electrode with its tip centered with respect to the center of the torch nozzle constricting outlet orifice so that there is not tendency for the electrode to slip from its locked position.

It is yet another object of the present invention to provide a gas shielded plasma arc torch and an adjustable collet assembly construction which functions independent of the length of a collet and permits the electrode to be held in a stable configuration without a tendency to slip for all adjusted positions.

Moreover, it is still a further object of the present invention to provide a gas shielded plasma arc torch which will permit the gripping of an electrode in a stable configuration for all positions assumable by the electrode in the torch bore such that the tip of an electrode may be accurately centered with respect to the torch nozzle constricting outlet orifice by a relatively unskilled operator and without the need for the exercise of operator judgment.

These and other objects will be apparent from the following description and claims in conjunction with the drawings.

SUMMARY OF THE INVENTION

The present invention may be generally characterized as a gas shielded plasma arc torch and collet assembly in combination comprising:

a collet for receiving and gripping an electrode with said collet having a front end surface and a rear end surface with a bore extending from said front end surface to said rear end surface wherein at least a portion of said front end surface is defined by a first selected sphere and at least a portion of said rear end surface is defined by a second selected sphere;

first means for rotatably engaging said collet front end spherical surface;

second means for rotatably engaging said collet rear end spherical surface;

means for locking the position of said collet with respect to said torch and for causing said collet to grip said received electrode, thereby locking and fixing the position of said received electrode, said locking means being reversibly operable for releasing said collet and said received electrode.

A second aspect of the present invention may be generally characterized as a collet assembly for use in a gas shielded plasma arc torch having a bore for receiving an electrode comprising:

a collet for receiving and gripping said electrode with said collet having a front end surface and a rear end surface with a bore extending from said front end surface to said rear end surface, wherein at least a portion of said front end surface is defined by a first selected sphere and at least a portion of said rear end surface is defined by a second selected sphere; and means for rotatably engaging said collet rear end spherical surface and adapted to be slidably mounted in said torch for movement transverse to the longitudinal axis of said torch bore.

A third aspect of the present invention may be generally characterized as a collet having a bore extending therethrough from a first end surface to an opposite second end surface for receiving an electrode for use in a gas shielded plasma arc torch comprising:

a multi-pronged first portion for gripping a received electrode terminating in said first end surface defined by a portion of a first selected sphere for rotatably engaging a first seating means;

a second portion extending from said first portion terminating in said opposite second end surface defined by a portion of a second selected sphere for rotatably engaging a second seating means.

DESCRIPTION OF THE PREFERRED EMBODIMENT

In order to afford a complete understanding of the present invention and an appreciation of its advantages, a description of the preferred embodiments is presented below.

Figure 1:
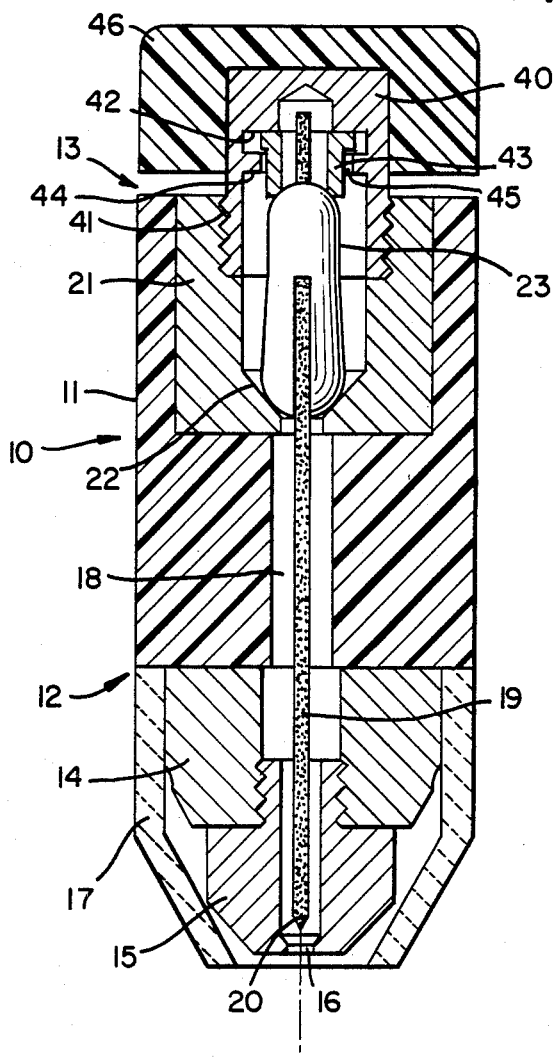
FIG. 1 is a simplified schematic drawing in cross-section of a gas shielded plasma arc torch in accordance with the present invention.

With reference to the drawings, FIG. 1 illustrates a gas shielded plasma arc torch 10 in accordance with the present invention. Torch 10 comprises a torch body 11, suitably molded of plastic, having a front end 12 and a rear end 13. A replaceable front end member 14 is joined to the front end 12 of the torch body 11, for example, by screws (not shown). A gas nozzle 15 having a constricting outlet orifice 16 is joined to the front end member 14, for example, by a screw type fitting. A heat shield 17 is joined to front end member 14, for example, by threads (not shown) and surrounds the gas nozzle 15 and front end member 14. The torch has a bore 18 for receiving a rigid non consumable electrode 19, for example, constructed of tungsten or zirconium. The tip 20 of electrode 19 is illustrated centered with respect to the gas nozzle constricting outlet orifice 16. Such gas shielded plasma arc torches are well known in the art of cutting and welding and would have connections and passages for orifice gas, shielding gas, cooling water, main arc electrical power, and pilot arc high frequency electrical power (all not shown). The orifice gas exits the torch through gas nozzle 15 via constricting outlet orifice 16.

Positioned within the torch body 11 is collet support member 21 which is embedded in the torch body. Collet support member 21 is suitably fabricated from, e.g., copper or copper alloy. Collet support member 21 has a bore therethrough with the central axis of collet support member bore substantially coinciding with the central axis of the torch body bore 18. The collet support member 21 and/or the collet support member seat 22 are advantageously located in the rear portion of the torch body 11. By rear portion of the torch body is meant that if torch body 11 is divided into two halves lengthwise (i.e., measured from the torch body rear end 13 to torch body front end 12) the rear portion of the torch body would be that portion including the rear end 13. A portion of the collet support member bore defines a seat 22 advantageously having the shape of a truncated cone for reasons hereinafter discussed. That is, seat 22 has an inclined edge surface. The base of truncated cone defining the seat 22 faces the rear end of the torch body with the plane of the base being substantially perpendicular to the center line of the bore. Other geometric shapes for the seat may be used by one skilled in the art.

A collet 23 for receiving and gripping electrode 19 is located in collet support member 21.

Figure 2A:
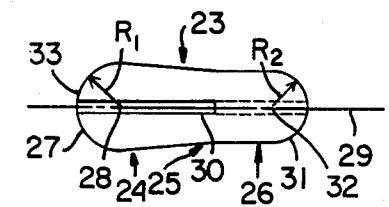
FIG. 2A is a view of a collet used in the gas shielded plasma arc torch of FIG. 1 in accordance with the present invention.
Figure 2B:
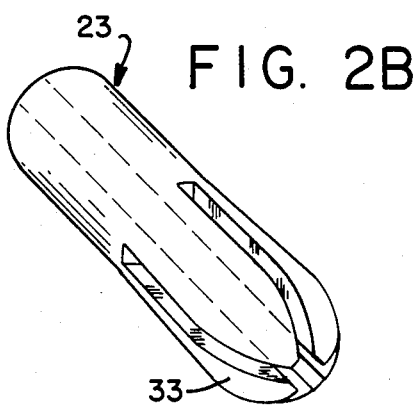
FIGS. 2B and 2C are perspective views of the collet of FIG. 2A in accordance with the present invention.
Figure 2C:
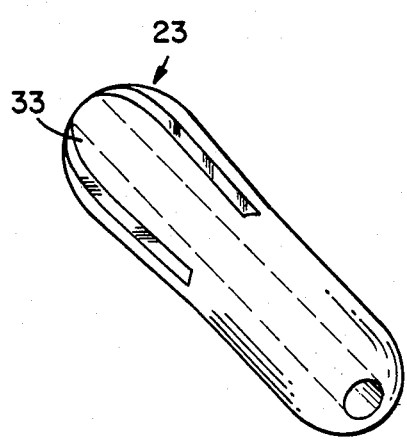

Collet 23, illustrated in detail in FIGS. 2A, 2B and 2C, has a front section 24, a central section 25 and a rear section 26. The surface 27 of the front section 24 of collet 23 engages seat 22 of collet support member 21. The portion of front surface 27 for engaging seat 22 is defined by a first selected sphere illustrated in FIG. 2A as having a radius $R_1$ with a center at 28. Center 28 of the selected sphere defined by radius $R_1$ is suitably located substantially on the center line 29 of bore 30 which extends from the front section 24 to the rear section 26 of collet 23 for receiving electrode 19. Collet 23 is suitably fabricated from, e.g., copper, brass or copper alloy.

The torch also includes a knob member 40 suitably constructed of copper, copper alloy or brass positioned at the rear end 13 of torch body 11. The knob member, as illustrated in FIG. 1, has a recessed construction, stated otherwise a bore, for receiving collet 23 and electrode 19. Knob member 40 is joined to collet support member 21 by a screw type fitting 41. Knob member 40 has a substantially flat forward facing surface 42 which is defined by a plane substantially perpendicular to (e.g., within about ±5°) the central axis of torch bore 18. Knob member 40 has a seating means for engaging surface 31 of rear section 26 of collet 23. As illustrated in FIG. 1, the knob member 40 seating means comprise a cap 43, suitably constructed of, e.g., brass, copper or copper alloy, mounted for movement with respect to forward facing surface 42. Cap 43 is permitted small movement in a direction perpendicular to the central or longitudinal axis of torch bore 18 and in the direction of the central axis of torch bore 18 by collar-like member 44 which mounts cap 43 and defines an aperture 45 suitably substantially circular in geometrical shape. Cap 43 and collar-like member 44 provide what is referred to in the art as a snap-type fitting for mounting cap 43. That is, cap 43 is a seating means slidably mounted for movement transverse to the longitudinal axis of torch bore 18. The center of the aperture 45 defined by collar like member 44 would be suitably substantially coincident with the central axis of torch bore 18. Variations in the detail of the design of the knob member 40 seating means may be accomplished by one skilled in the art.

The portion of the rear surface 31 of the rear section 26 of collet 23 for engaging the seat of cap 43 is defined by a second selected sphere illustrated in FIG. 2A as having a radius $R_2$ with a center at 32. Center 32 of the selected sphere defined by radius $R_2$ is suitably substantially located on center line 29 of bore 30 of collet 23.

In the embodiment of the collet 23 in accordance with the present invention illustrated in FIGS. 2A, 2B and 2C, it is contemplated that $R_1$ may be greater in length that $R_2$, $R_1$ may be less in length than $R_2$, or $R_1$ may be equal in length to $R_2$ but that center 28 is not coincident with center 32. Other possible collet configurations are hereinafter discussed. A particular collet design would be selected by one skilled in the art in accordance with the design requirements of a particular torch.

The rear end portion of knob member 40 is suitably covered with handle member 46 suitable formed of, e.g., plastic.

The collet 23, the collet support member 21, and the collet knob member 40 function as follows in gripping and fixing and locking the position of a received electrode 19.

Screw type fitting 41 joining knob member 40 to collet support member 21 permits knob member 40 to be tightenable. That is, upon tightening knob member 40 (e.g., providing an external clockwise force to knob member 40 if screw type fitting 41 is a right hand screw or an external counter-clockwise force if screw type fitting 41 is a left hand screw) forward facing surface 42 of knob member 40 firmly engages the surface of cap 43 adjacent knob surface 42 thereby transmitting a force component parallel to the center line of torch body bore 18 in the forward direction through cap 43 to collet 23 via the engagement of collet rear section surface 31 with the seat of cap 43. Collet support member seat 22 in engagement with collet front section surface 27 will therefore established an opposite reaction force component parallel to the center line of torch body bore 18. (It will be readily understood by one skilled in the art that torch body 11 is being restrained from motion by a second externally applied force when knob member 40 is being tightened.)

It will be apparent that the forces established by tightening knob 40 will create forces to lock and fix cap or seat 43 between knob forward facing surface 42 and collet rear section surface 31 and forces to lock and fix the position of collet 23 between cap 43 and collet support member seat 22. That is, the position or location of collet 23 and the knob member seating means will become locked or fixed by the forces established by tightening knob member 40. That is, the position of collet 23 becomes locked and fixed with respect to torch 10.

Knob member 40 is likewise reversibly operable to unlock or release collet 23 and the knob member seating means (i.e., cap 43 is unlocked and regains freedom for movement as limited by collar like member 44).

The collet 23 is caused to grip and fix and lock the position of a received electrode 19 in the following manner. Referring to FIGS. 2A, 2B and 2C, the front section 24 of collet 23 comprises a plurality of jaw-like or prong-like members 33 which are in integral, continuous portion of collet 23. Without the application of an external force, the collet 23 loosely holds the received electrode 19. Jaws 33 have internal surfaces (i.e., facing collet bore-center line 29 and forming in essence a portion of collet bore 30) for gripping and thereby locking and fixing the position of a received electrode with respect to the collet when force components are established on jaw-like or prong-like members 33 urging them toward collet bore center line 29.

Accordingly, when knob member 40 is tightened urging collet 23 against collet support member seat 22, collet support member seat 22 will establish force components (i.e., substantially perpendicular to center line 29 of collet bore 30) at the area of contact of collet forward section surface 27 with collet support member seat 22 to urge jaw-like members 33 to grip and lock and fix the position of electrode 19 with respect to collet 23. Thus, the geometary of seat 22 is selected to perform this function. Since the tightening of knob member 40 locks and fixes the position of collet 23 with respect to torch 10, the position of electrode 19 is likewise locked and fixed with respect to torch 10.

Reversibly operating knob member 40 causes collet 23 to release received electrode 19.

Collet 23 may, therefore, be said to comprise a multi-pronged 33 first portion for gripping a received electrode with the prong-like members 33 terminating in end surface 27, illustrated in FIG. 2A. Collet 23 thus has a second portion extending from the first portion which terminates in opposite end surface 31 of FIG. 2A.

The operation of the present invention is as follows. Knob member 40 is slightly loosened and accordingly, cap 43 and collet 23 are unlocked. Cap 43 is free to move within collar like member 44, collet 23 is free to rotate in collet support member seat 22 about center point 28 of radius $R_1$ defining the collet front end spherical surface 27. Stated otherwise, collet 23 rotatably engages collet support member seat 22 on spherical surface 27. When collet 23 rotates in collet support member seat 22 about center point 28, center point 32 of radius $R_2$ defining collet rear section spherical surface 31 (and hence rear end surface 31) will translate or move in a plane perpendicular to (i.e., transverse to) the central axis of torch bore 18. For small angles of rotation of collet 23 about center point 28, center point 32 wil have a very small translation in a direction parallel to the central axis of torch bore 18. For small angles of rotation of collet 23, the translation of center point 32 and rear end surface 31 in a direction parallel to the central axis of torch bore 18 can be ignored as a practical matter.

Stated otherwise, center point 32 translates (or rotates) with respect to center point 28 as collet 23 rotates about center point 28 on spherical surface 27 engaging collet support member seat 22. Since spherical surface 27 is defined by radius $R_1$ having an origin at center point 28, center point 28 remains fixed with respect to seat 22 as collet 23 rotates about point 28.

As center point 32 translates with respect to center point 28 due to the rotation of collet 23 about center point 28, cap 43 is free to move responsive to the translation of center point 32 with respect to center point 28 with such movement being urged by the engagement of collet rear end spherical surface 31 with the seat of cap 43. That is, the knob member seating means 32 is moving responsive to the translation or movement of collet 23 rear end spherical surface 31.

Since collet rear end surface 31 engaging the seat of cap 43 is defined by radius $R_2$ having an origin at center point 32, surface 31 is free to rotate in the seat of cap 43 with respect to center point 32.

It is contemplated that rotation of collet 23 will be induced as follows. Heat shield 17 and gas nozzle 15 are removed from torch 10. The tip 20 and the forward end of electrode 19 are now exposed. Knob member 40 is loosened slightly. Tip 20 of electrode 19 is now moved by an external source to a selected position. It will be apparent that it would be highly advantageous if this selected position was the position which would accurately center tip 20 of electrode 19 with respect to constricting outlet orifice 16 of gas nozzle 15. Since electrode 19 is received by collet 23, movement of tip 20 of electrode 19 to a selected position will cause the hereinbefore described rotation of collet 23 about center point 28 in collet support member seat 22; the translation of center point 32 with respect to center point 28; the translation of cap 43 responsive to the translation of center point 32 (stated otherwise, the translation or movement of cap 43 responsive to the translation or movement of rear end spherical surface 31); and the rotation of collet rear end spherical surface 31 in engagement with the seat of cap 43. Knob member 40 is then tightened which causes the locking of cap 43 (the knob member seating means); causes the locking of the position of collet 23 and the gripping of electrode 19 by collet 23 and thereby the locking and fixing of the position of the electrode 19 as hereinbefore described and accordingly fixes the position selected for the tip 20 of electrode 19.

It will be apparent to one skilled in the art that because of the design and the motions of the collet 23 and seating means 22 and 43, no forces are established in locking and fixing the position of electrode 19 which would tend to cause the collet or the seating means to slip or move and hence move electrode 19 from its selected fixed locked position. Hence electrode 19 has been gripped and locked and fixed in position in a stable configuration.

The rotation of collet 23 in collet support member seat 22 about center point 28 would typically be confined to small angles (e.g., about 0° to 5° in a selected plane parallel to and passing through the central axis of torch bore 18) which could correspond to the motion available to an electrode within a typical torch bore to rotate about a point defined by center point 28.

Figure 3:
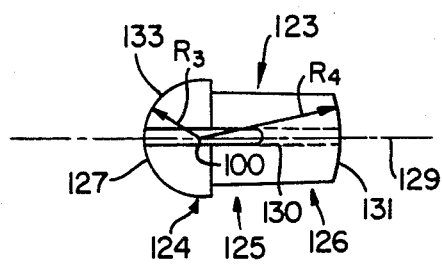
FIG. 3 is a view of an alternate embodiment of a collet for use in the gas shielded plasma arc torch of FIG. 1 in accordance with the present invention.

An alternate embodiment of the present invention would be use of a collet 123 as illustrated in FIG. 3. Collet 123 has a front section 124, a central section 125 and a rear section 126 with a bore 130 extending from the front section 124 to the rear section 126 for receiving an electrode. The front section of collet 123 comprises a plurality of jaw-like members 133 which are an integral, continuous portion of collet 123 for gripping a received electrode as hereinbefore described in conjunction with collet 23 of FIGS. 2A and 2B. The surface 127 of the front section 124 of collet 123 engages collet support member seat 22 as before. The portion of front surface 127 for engaging seat 22 is defined by a first selected sphere having a radius $R_3$ with a center 100. Center 100 is suitably located substantially on collet bore center line 129. As in the foregoing, collet 123 rotates in collet support member seat 22 about center 100. The surface 131 of the rear section 126 of collet 123 engages the knob member seating means. The portion of rear surface 131 for engaging the knob member seating means is defined by a second selected sphere having a radius $R_4$ with a center 100.

A difference between collet 123 of FIG. 3 and collet 23 of FIGS. 2A, 2B and 2C is that for collet 123 the center 100 of the first selected sphere defined by radius $R_3$ is coincident with the center 100 of the second selected sphere defined by radius $R_4$ whereas for collet 23 the centers of the first and second selected spheres are not coincident.

Accordingly, collet 123 rear section spherical surface 131 rotates in the knob member seating means about center point 100. It will be therefore apparent that in embodiments of the torch of the present invention employing a collet 123, it is not required that the knob member seating means be movable. The seat on knob member 40 forward facing surface 42 may be stationary and the advantageous results of the present invention will still be achieved since the first selected sphere defining the collet front end surface 127 and the second selected sphere defining the collet rear end surface 131 have a coincident center point and thus there is no translation or rotation of two center points with respect to each other.

For collets in which the first and second selected spheres have substantially coincident center points, the radii defining the first and second selected spheres would have different lengths. In collet 123 illustrated in FIG. 3, radius $R_3$ is less than radius $R_4$. Collets could be designed for use wherein $R_3$ is greater than $R_4$.

Collet 123 could be satisfactorily employed with a movable seating means such as the floating cap assembly hereinbefore described.

Operation of the torch of the present invention using collet 123 would otherwise be substantially as hereinbefore described.

$R_3$ may approach $R_4$ in length and the present invention will function in a satisfactory manner. That is, center section 125 of collet 123 may be small, if desired, for a particular design.

Similarly, for collet 23 of the embodiment illustrated in FIGS. 2A, 2B, and 2C, the centers 28 and 32 may approach each other and thus center section 25 may be small.

Of importance is that the adjustable collet assembly and collet in accordance with the present invention function independent of the length of the collet to lock an electrode in a stable configuration without a tendency to slip in a gas shielded plasma arc torch for all adjustable positions of the electrode.

This is advantageous in that torch design is not constrained by collet length requirements.

It is contemplated that the tip of an electrode would be centered with respect to the constricting outlet orifice of a gas nozzle for the gas shielded plasma arc torch of the present invention in the following manner. The heat shield 17 and gas nozzle 15 of torch 10 illustrated in FIG. 1 are removed from torch 10. The tip 20 and the forward end of electrode 19 are now exposed. As hereinbefore described, knob member 40 is loosened slightly.

Figure 4:
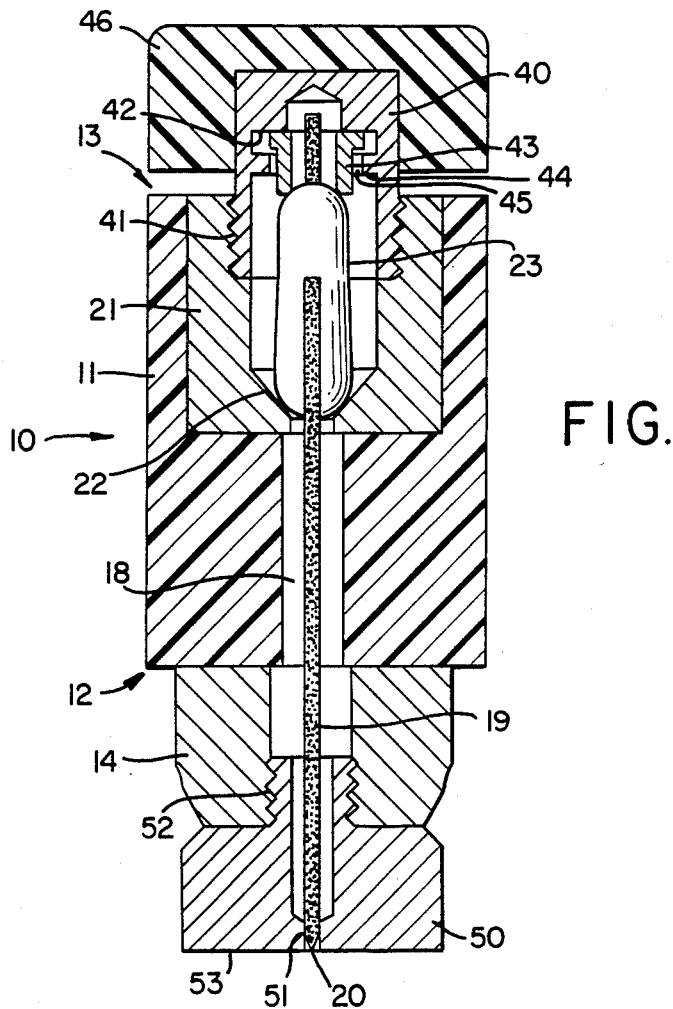
FIG. 4 is a simplified schematic drawing in cross-section of the gas shielded plasma arc torch of FIG. 1 with the heat shield and gas nozzle removed and an electrode centering tool installed in accordance with the present invention.

Referring to FIG. 4, an electrode centering tool 50 having a bore 51 for receiving the electrode 19 is engaged with the electrode and is screwed 52 and seated onto front end member 14 of torch 10 where nozzle 15 is normally screwed and seated. The bore 51 of tool 50 is accurately machined with respect to constricting outlet orifice 16 of nozzle 15 so as to accurately center the tip 20 of electrode 19 with respect to constricting nozzle orifice 16. The tip 20 of electrode 19 is now accurately centered, knob member 40 is tightened and accordingly electrode 19 and therefore tip 20 is fixed and locked in place as hereinbefore described.

The electrode centering tool 50 may also be used to set the gap between the electrode tip 20 and the constricting nozzle orifice 16 by machining the tool 20 so that the correct gap is set when the electrode tip is flush with end 53 of tool 50 when the tool is seated. The electrode 19 would be manipulated prior to tightening knob member 40 to achieve this setting.

With electrode 19 fixed and locked with tip 20 being centered by tool 50, centering tool 50 is removed and the gas nozzle 15 and heat shield 17 are mounted in place.

The advantages of the gas shielded plasma arc torch in accordance with the present invention will be readily apparent. An electrode is gripped, fixed and locked in place with the tip of the electrode centered with respect to a constricting outlet orifice of a gas nozzle in a stable configuration without forces being established which will tend to move the electrode and hence the tip of the electrode off the centered positioned. The present invention functions independent of the length of the collet for all adjustable positions and thus, torch design is not constrained by collet length requirements.

Precision and expensive machining for the construction of the torch in order to achieve electrode centering by a precision torch construction is avoided. The elements of the torch bore of the present invention are not required to be aligned with precision. In the torch of the present invention, the tip of the electrode is positioned in the centered position (or any selected position) and the electrode is then locked and fixed in this position.

A rigid electrode having eccentricities is easily centered. The tip of the electrode is centered and then the electrode is locked and fixed in position.

The torch of the present invention permits accurate electrode centering with respect to a constricting outlet orifice without the need for operator skill or judgement.

Although preferred embodiments of the present invention have been described in detail, it is contemplated that modifications may be made and that some features may be employed without others, all within the spirit and scope of the invention. For example, the orientation of the collet in the torch described herein could be reversed. Both ends of the collet could comprise a plurality of jaw-like or prong-like members.

What is claimed is:

1. A gas shielded plasma arc torch comprising:
   a torch body having a longitudinal axis with a front end and a rear end having a bore for receiving an electrode;
   a collet support member in said torch body having a seat;
   a collet in said collet support member having a front section, an elongated center section and a rear section for receiving and gripping said electrode;
   at least a portion of the surface of said collet front section being defined by a first selected sphere engaging said collet support member seat for rotation in said seat about the center of said first selected sphere;
   a knob member screwed into the rear of said collet support member having seating means mounted on a forward facing surface;
   at least a portion of the surface of said collet rear section being defined by a second selected sphere having a center essentially coincident with the center of said first selected sphere wherein the centers of the first and second spheres lie at essentially the same location along the longitudinal axis of the torch and with the radius of the first sphere being different than the radius of the second sphere; and
   said knob member being tightenable for locking the position of said collet and causing said collet to grip said received electrode thereby locking and fixing the position of said received electrode and reversibly operable for releasing said collet and said received electrode.

2. A gas shielded plasma arc torch as recited in claim 1 wherein said collet support member seat is located in the rear portion of said torch body.

3. A gas shielded plasma arc torch as recited in claim 1 wherein said knob member seating means is mounted stationary with respect to said forward facing surface.

4. A gas shielded plasma arc torch and collet assembly in combination comprising:
   a collet for receiving and gripping an electrode including an elongated central section, a front section, a rear section and a bore extending through each section of said collet, with said front and rear sections having a spherically curved portion on opposite ends of said collet and with each spherically curved portion having a radius extending from locus points spaced apart from one another along the centerline of said bore;
   collet support means in said torch for engaging the spherically curved portion of said front section;
   a movable cap slidably mounted on the spherically curved portion of said rear section for movement transverse to a longitudinal axis of said torch in response to movement of said collet; and manually adjustable locking means mounted upon said movable cap in engagement with said collet means such that upon tightening said locking means said collet is locket in a fixed position and upon loosening said locking means said collet and movable cap may be adjusted relative to one another for fixing the position of said electrode relative to said torch longitudinal axis.

5. A collet assembly for use in a gas shielded plasma arc torch for receiving and gripping an electrode comprising:

a collet having an elongated central section, a front section, a rear section and a bore extending through each section with the front and rear section having a spherically curved portion on opposite ends of said collet and with each spherically curved portion having a radius extending from locus points spaced apart from one another along the centerline of said bore; and a movable cap adapted to be slidably mounted on the spherically curved portion of said rear section for movement transverse to a longitudinal axis of the torch in response to movement of said collet.

6. An apparatus as recited in claim 5 wherein at least said front or rear section of said collet comprises a plurality of prong-like members for gripping said electrode.

7. An apparatus as recited in claim 6 wherein said prong-like members terminate in said collet front end spherical surface.

8. An apparatus as recited in claim 6 wherein the length of the radius defining said first selected sphere is different than the length of the radius defining said second selected sphere.

9. An apparatus as recited in claim 7 wherein the length of the radius defining said first selected sphere equals the length or the radius defining said second selected sphere.

* * * * *